(12) United States Patent
Moriyama et al.

(10) Patent No.: US 12,725,780 B2
(45) Date of Patent: Sep. 1, 2026

(54) MANUFACTURING METHOD OF ELECTRODE SHEET

(71) Applicant: TOYOTA JIDOSHA KABUSHIKI KAISHA, Toyota (JP)

(72) Inventors: Satoshi Moriyama, Nagoya (JP); Takenori Ikeda, Owariasahi (JP); Masashi Yamakita, Nagoya (JP); Tetsuya Mimura, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 546 days.

(21) Appl. No.: 18/225,362

(22) Filed: Jul. 24, 2023

(65) Prior Publication Data

US 2024/0105906 A1 Mar. 28, 2024

(30) Foreign Application Priority Data

Sep. 28, 2022 (JP) ................................ 2022-155533

(51) Int. Cl.
*H01M 4/04* (2006.01)
*H01M 4/02* (2006.01)

(52) U.S. Cl.
CPC .... *H01M 4/0435* (2013.01); *H01M 2004/021* (2013.01)

(58) Field of Classification Search
CPC ... H01M 4/0409; H01M 4/0435; H01M 4/139
See application file for complete search history.

(56) References Cited

U.S. PATENT DOCUMENTS

2008/0074462 A1 3/2008 Hirakawa
2016/0006018 A1* 1/2016 Wang ................. H01M 4/0471 427/126.6
2016/0082467 A1* 3/2016 Mikami ................ H01M 4/139 118/244
2022/0238855 A1* 7/2022 Enokihara ........... H01M 4/0409

FOREIGN PATENT DOCUMENTS

JP 2008-074018 A 4/2008
JP 2017-157495 A 9/2017
JP 2018-045840 A 3/2018
JP 2018-063776 A 4/2018
JP 2019-106311 A 6/2019
JP 2022-114663 A 8/2022

* cited by examiner

*Primary Examiner* — Amanda C. Walke
(74) *Attorney, Agent, or Firm* — Dinsmore & Shohl LLP

(57) ABSTRACT

A manufacturing method of an electrode sheet comprising: a preparation step of preparing a wet granulated body containing an electrode material and a solvent, a film forming step of passing the wet granulated body through a gap between a first roll and a second roll having a solvent absorbing portion on an outer peripheral surface to form an electrode material layer on an outer peripheral surface of the second roll, and a transfer step of transferring the electrode material layer onto a substrate.

4 Claims, 1 Drawing Sheet

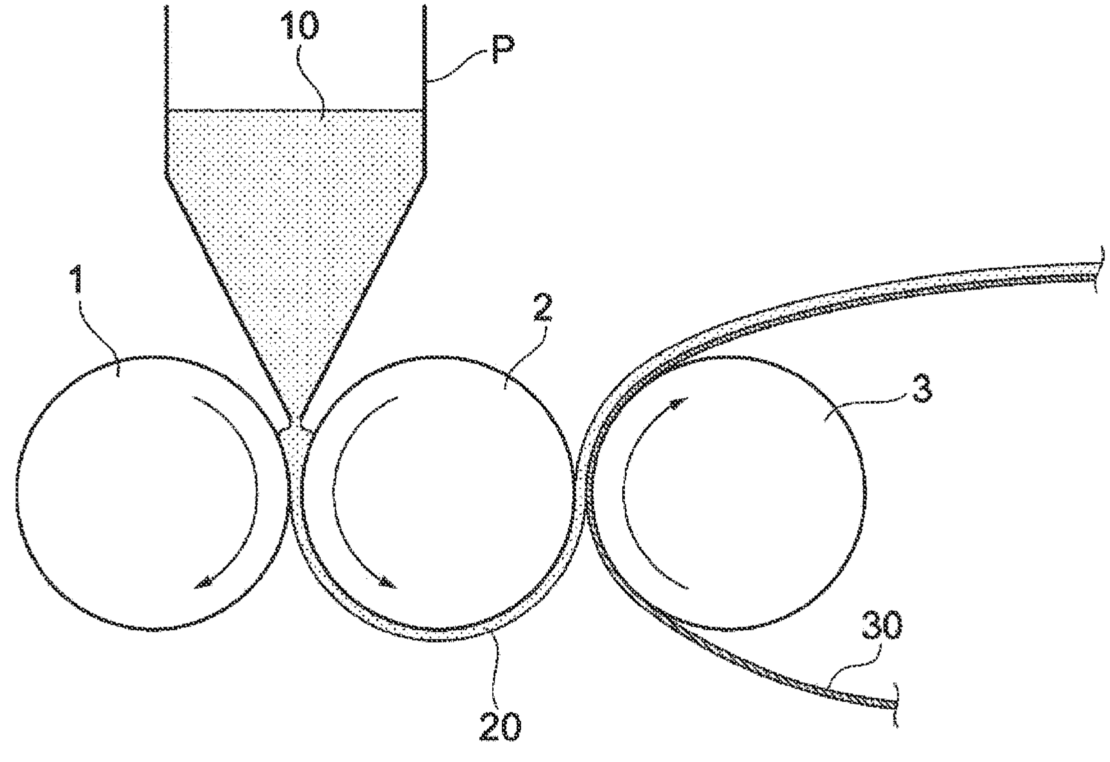
10
P
1
2
3
30
20

MANUFACTURING METHOD OF ELECTRODE SHEET

CROSS-REFERENCE TO RELATED APPLICATION

This application claims priority to Japanese Patent Application No. 2022-155533 filed on Sep. 28, 2022, incorporated herein by reference in its entirety.

BACKGROUND

1. Technical Field

The present disclosure relates to a manufacturing method of an electrode sheet.

2. Description of Related Art

In recent years, a secondary battery such as a lithium-ion secondary battery has been suitably used as a portable power source for devices such as a personal computer or a mobile terminal, or a power source for driving vehicles such as a battery electric vehicle (BEV), a hybrid electric vehicle (HEV), a plug-in hybrid electric vehicle (PHEV), and the like.

As an electrode in a secondary battery, an electrode sheet in which an electrode material layer containing an electrode material (for example, an active material or the like) is provided on a base material (for example, a current collector foil or the like) is generally used.

In a manufacturing line of an electrode sheet, in general, a wet granulate containing an electrode material and a solvent is passed through a gap between a pair of rolls, an electrode material layer is formed on an outer peripheral surface of one roll of the pair of rolls, and then the electrode material layer is transferred onto a base material. Thus, an electrode sheet is obtained (see, for example, Japanese Unexamined Patent Application Publication No. 2019-106311 (JP 2019-106311 A)).

SUMMARY

However, in a conventional manufacturing method of an electrode sheet, when a wet granulate is used and an electrode material layer formed on an outer peripheral surface of the roll is transferred onto a base material, a solvent component contained in the wet granulate may be exuded from the formed electrode material layer. The exuded solvent component makes it difficult for the electrode material layer to be peeled off from the roll, and transfer failure of the electrode material layer for the base material may occur. JP 2019-106311 A discloses the use of a specific wet granulate in order to reduce a film forming failure of the electrode material layer transferred onto the surface of the current collector foil, which is a base material. However, the transfer failure of the electrode material layer caused by the exudation of the solvent component contained in the wet granulate to the roll is not disclosed. There is a need for a new manufacturing method of an electrode sheet. In view of the above circumstances, an object of the present disclosure is to provide a manufacturing method of an electrode sheet for reducing a transfer failure of an electrode material layer to a base material.

A method for solving the above issue include the following method.

1. A manufacturing method of an electrode sheet includes: a preparation step of preparing a wet granulate containing an electrode material and a solvent; a film forming step of passing the wet granulate through a gap between a first roll and a second roll including a solvent absorbing portion on an outer peripheral surface, to form an electrode material layer on the outer peripheral surface of the second roll; and a transfer step of transferring the electrode material layer onto a base material.
2. In the manufacturing method described in the above 1, the solvent absorbing portion is a porous material.
3. In the manufacturing method described in the above 2, the porous material has a porosity of 5% to 30% and a pore size of 0.1 lam to 3.2 mm.
4. In the manufacturing method described in any one of the above 1 to 3, the wet granulate has a solid content of 75.96% by mass to 80.31% by mass.
5. The manufacturing method described in any one of the above 1 to 4 further includes a roll drying step of drying the second roll prior to the film forming step.

According to the present disclosure, a manufacturing method of an electrode sheet for reducing a transfer failure of an electrode material layer to a base material is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic diagram illustrating an example of a film forming step and a transfer step in the manufacturing method of an electrode sheet according to the present disclosure.

DETAILED DESCRIPTION OF EMBODIMENTS

In the present specification, a numerical range expressed by using "from" means a range including numerical values described before and after "from" as a lower limit value and an upper limit value. In the numerical ranges described in the present disclosure in a stepwise manner, the upper limit value or the lower limit value described in one numerical range may be replaced with the upper limit value or the lower limit value of the numerical range described in another stepwise manner. In addition, in the numerical range described in the present disclosure, the upper limit value or the lower limit value of the numerical range may be replaced with the value shown in the examples. In the present disclosure, the amount of each component in the composition means the total amount of the plurality of substances present in the composition, unless otherwise specified, when a plurality of substances corresponding to each component are present in the composition. In the present disclosure, the term "step" is not only an independent step. If the intended purpose of the process is achieved, even if it cannot be clearly distinguished from other processes, the process is included in this term.

Hereinafter, an embodiment which is an example of the present disclosure will be described. These descriptions and examples are illustrative of the embodiments and are not intended to limit the scope of the disclosure.

Manufacturing Method of an Electrode

A manufacturing method of an electrode according to the present disclosure is a manufacturing method of an electrode sheet including a preparation step of preparing a wet granulated body containing an electrode material and a solvent, a film forming step of passing the wet granulated body through a gap between a first roll and a second roll having a solvent absorbing portion on an outer peripheral surface thereof and forming an electrode material layer on an outer peripheral surface of the second roll, and a transfer step of transferring the electrode material layer onto a substrate. In the manufacturing method of an electrode sheet of the present disclosure, the second roll has a solvent absorbing portion on an outer peripheral surface thereof. Therefore, for example, the solvent component contained in the wet granulate is easily absorbed by the outer peripheral surface of the second roll when the electrode material layer is formed. Therefore, even in the subsequent transfer step, exudation of the solvent component from the electrode material layer is reduced. Then, the peelability of the electrode material layer from the roll is improved. As a result, a transfer failure of the electrode material layer to the base material is reduced.

An example of a manufacturing method of an electrode sheet of the present disclosure will be described with reference to the drawings. FIG. 1 is a schematic diagram illustrating an example of a film forming step and a transfer step in the method of manufacturing an electrode sheet according to the present disclosure.

In the manufacturing method of an electrode sheet shown in FIG. 1, a manufacturing apparatus including a container P containing a wet granulate 10, a first roll 1, a second roll 2, and a third roll 3 is used. The second roll 2 has a solvent absorbing portion in the entire region of the outer peripheral surface. Although not shown, in the manufacturing apparatus, the base material 30 is provided on the outer peripheral surface of the transfer belt stretched by the third roll 3. Although not shown, the manufacturing apparatus includes a heat source device that heats and dries the outer peripheral surface of the second roll 2 on the region side of the second roll 2 where the electrode material layer 20 is not formed. In the manufacturing method of an electrode sheet shown in FIG. 1, before the wet granulate is passed through the gap between the first roll 1 and the second roll (i.e., before the film forming step), the outer peripheral surface of the second roll 2 is dried by the heat source device, and the solvent absorbency of the solvent absorbing portion in the second roll 2 is improved in advance (roll drying step). Thereafter, the wet granulate 10 is passed through the gap between the first roll 1 and the second roll. The wet granulate 10 having passed through the gap is formed on the outer peripheral surface of the second roll 2, and becomes the electrode material layer 20 (film forming step). At this time, at least a part of the solvent component contained in the wet granulate 10 is absorbed in the solvent absorbing portion provided on the outer peripheral surface of the second roll 2. Then, the electrode material layer 20 passes through the gap between the second roll 2 and the third roll 3, and is transferred to the base material 30 provided in contact with the outer peripheral surface of the third roll 3 (transfer step). Although not shown, in the manufacturing method of an electrode sheet shown in FIG. 1, the base material 30 to which the electrode material layer has been transferred is dried from the side on which the electrode material layer 20 is provided, and is pressed and cut as necessary. As a result, a final electrode sheet is obtained.

The first roll 1, the second roll 2, and the third roll 3 rotate in the arrow direction shown in FIG. 1. Although not shown, in the manufacturing method of an electrode sheet shown in FIG. 1, the rotation speed is adjusted so as to increase in the order of the third roll>the second roll>the first roll from the viewpoint of selectively forming the electrode material layer on the roll and improving the transferability. Note that the roll-selective layer formation and transferability may be controlled by adjusting the releasability in the order of the first roll>the second roll>the third roll by selecting the material of the outer peripheral surfaces of the first roll, the second roll, and the third roll.

Hereinafter, a manufacturing method of an electrode sheet of the present disclosure will be described in detail for each step. Note that the reference numerals are omitted.

Preparation Step

In the preparation step, a wet granulate containing an electrode material and a solvent is prepared. A commercially available wet granulate may be obtained depending on the type of electrode sheet desired. The wet granulate may be appropriately designed and manufactured from a known material configuration. The wet granulated body of the present disclosure includes an electrode slurry and an electrode paste for an all-solid-state battery as a concept. As the electrode material, for example, a known material included in an electrode such as an electrode active material, a binder, an electrolyte, solvents, a thickener, a conductive material, an AB, CNT, or graphene can be used. As the solvent, for example, a known solvent that can be used for wet granules such as water, N-methyl-2-pyrrolidone (NMP), or the like can be applied.

The wet granulate may have a solids content of 75.80% to 83.50% by weight, or 75.96% to 80.80% by weight, or 75.96% to 80.31% by weight, or 78.66% to 80.31% by weight. In the conventional manufacturing method of an electrode sheet, when the solid content ratio in the wet granulate is high, exudation of the solvent component from the electrode material layer is more likely to occur in a transfer step to be described later, and the peelability of the electrode material layer from the roll is lowered. As a result, transfer failure of the electrode material layer to the substrate tends to occur more easily. On the other hand, in the manufacturing method of an electrode sheet of the present disclosure, the solvent component tends to be absorbed by the solvent absorbing portion on the outer peripheral surface of the second roll even when the solid content ratio is within the above range. Therefore, the transfer failure of the electrode material layer to the base material is reduced. The solid content ratio is determined by the following measurement method. The wet granulate is vacuum dried at 100° C. or higher. The weight of the dry powder obtained is divided by the total weight of the wet granulate, and the value multiplied by 10 is taken as the solids content.

Film Forming Step

In the film forming step, the wet granulated body is passed through a gap between the first roll and a second roll having a solvent absorbing portion on an outer peripheral surface thereof, and an electrode material layer is formed on the outer peripheral surface of the second roll. The material of the first roll is not particularly limited.

The second roll is not particularly limited as long as it has a solvent absorbing portion on the outer peripheral surface. The solvent absorbing portion may be provided over the entire outer peripheral surface of the second roll. The solvent absorbing portion may be provided locally. In some embodiments, from the viewpoint that the solvent component is efficiently absorbed and the transfer failure is further reduced, the solvent absorbing portion is provided over the entire outer peripheral surface of the second roll.

In some embodiments, the solvent absorbing portion is a porous material from the viewpoint that the solvent component is efficiently absorbed and transfer failure is further reduced. In some embodiments, the porosity of the porous material is from 5% to 30%, from 8% to 25%, or from 10% to 20%, from the viewpoint that the solvent component is efficiently absorbed and the transfer failure is further reduced. The porosity is determined by the following method. The porous material formed on the outer peripheral surface of the second roll is divided by the volume of the measurement object by the pore deposition measured by the mercury porosimeter, and a value of 100 fraction is obtained. The value is the porosity of the porous material.

In some embodiments, the porous material has a pore diameter of 0.1 μm to 3.2 mm, 1 μm to 1 mm, or 100 μm to 500 μm, from the viewpoint that the solvent components are efficiently absorbed and the transfer failure is further reduced.

The porosity and the pore diameter of the porous material can be adjusted by, for example, shaving of a roll serving as a base material, sleeve structuring, surface treatment, or the like.

In one embodiment, from the viewpoint that the solvent components are efficiently absorbed and the transfer failure is further reduced, the porous material has a porosity of 5% to 30% and a pore diameter of 0.1 μm to 3.2 mm. In some embodiments, the porous material has a porosity of 8% to 25% and a pore diameter of 1 μm to 1 mm, and the porous material has a porosity of 10% to 20% and a pore diameter of 100 μm to 500 μm.

Examples of the material of the solvent absorbing portion include ceramics, resins, and metals. The material of the solvent absorbing portion may be used singly or in a combination of two or more. Examples of the ceramics include known fine ceramics such as alumina, zirconia, silicon carbide, boron carbide, silicon nitride, and aluminum nitride. Examples of the resin include nylon resins, fluorine-based resins (for example, vinylidene fluoride resins, etc.), polyester resins, polyethylene resins, polystyrene resins, and polyether ether ketone resins. Examples of the metal include iron, manganese, nickel, chromium, molybdenum, magnesium, silicon, aluminum, titanium, and alloys thereof. In some embodiments, among the above, the material of the solvent absorbing portion includes a ceramic material, includes alumina, from the viewpoint of efficiently absorbing the solvent component as a porous material to further reduce transfer failure.

Transfer Step

In the transfer step, the electrode material layer is transferred onto the substrate. Through the transfer step, an electrode sheet in which an electrode material layer is provided on a substrate is obtained. As the base material, for example, a known electrode base material such as a current collector foil can be used. The transfer unit is not particularly limited. The transfer unit may be either a transfer belt or a transfer roll. The transfer step may be, for example, a step in which the base material provided on the transfer belt stretched by the stretching roll is conveyed while the stretching roll (for example, the third roll shown in FIG. 1) is rotated, and the electrode material layer is transferred to the base material while being pressed by the gap between the stretching roll and the second roll.

Roll Drying Step

The manufacturing method of an electrode sheet according to the present embodiment further includes a roll drying step of drying the second roll before the film forming step, from the viewpoint that the solvent component is efficiently absorbed and the transfer failure is further reduced even when the electrode sheet is repeatedly manufactured. In the roll drying step, the second roll is dried before the film forming step.

The drying device is not particularly limited. The drying device may be any of heating and drying by hot air, infrared rays, microwaves, electromagnetic waves, and the like; heating and drying by a light beam such as a laser; and the like. The roll drying step may be, for example, a step of heating and drying the outer peripheral surface of the second roll to 40° C. or higher while the temperature of the outer peripheral surface of the second roll is confirmed by a temperature sensor such as a thermocouple from the viewpoint of efficiently drying the outer peripheral surface of the second roll.

Other Processes

The electrode sheet manufacturing method of the present disclosure may further include other steps other than a preparation step, a film forming step, a transfer step, and a roll drying step. Other steps include, for example, 1) a trimming step of trimming the formed electrode material layer with a laser, a chalk trimming, or the like after the film forming step; 2) a drying step of drying the electrode material layer after the transfer step; 3) a pressing step of pressing the electrode sheet with a roll press or the like after the transfer step; and 4) a cutting step of cutting the electrode sheet to a desired size or number (for example, single-wafer cutting) after the transfer step.

EXAMPLES

A positive electrode sheet for a lithium ion battery was manufactured using the manufacturing apparatus shown in FIG. 1. Specifically, the wet granules described in Japanese Unexamined Patent Application Publication No. 2018-45840 (JP 2018-45840 A) were prepared and contained in a container P (preparation step). The values of the solid content of the wet granules were as shown in Table 1. Before the formation of the electrode material layer, the outer peripheral surface of the second roll was heated and dried (roll drying step) while it was confirmed by the thermocouple that the temperature of the outer peripheral surface of the second roll was 40° C. or more. Then, the wet granulated material was passed through the gap between the first roll and the second roll, and the electrode material layer was formed on the outer peripheral surface of the second roll (film forming step). The second roll has a solvent absorbing portion made of alumina which is a porous material (porosity: 10%, average pore diameter: 400 μm) over the entire outer peripheral surface. Subsequently, in a gap between the second roll and the third roll (that is, the stretching roll), the base material (current collector foil, material: aluminum) provided on the transfer belt stretched by the third roll and the electrode material layer were pressed. Then, the electrode material layer was transferred onto the substrate (transfer step). Subsequently, from the electrode material layer side, it was dried by heating at 100° C. for 3 minutes in a heater, and was pressed by a roll press apparatus to increase the density. Thereafter, the electrode sheet was cut to a predetermined size. Then, an electrode sheet was manufactured.

Comparative Example

In the comparative example, the electrode sheet was manufactured by the same method as in the example except that the second roll was a stainless steel roll having no solvent absorbing portion on the outer peripheral surface. Incidentally, the value of the solid content ratio of the wet granules was the specification shown in Table 1.

Evaluation of Transcriptional Properties

When the electrode sheet was manufactured by the manufacturing method of each example, the outer peripheral surface region of the second roll on which the electrode material layer after the transfer step was provided was visually observed. The electrode sheet obtained by the manufacturing method of each example was visually observed. Then, the transfer failure of the outer peripheral surface region of the second roll and the electrode sheet was evaluated according to the following evaluation criteria. The results are shown in Table 1.

G1: No residue of the electrode-material layers was found on the outer peripheral surface of the second roll. In addition, no transfer defect was observed in the electrode material layer transferred onto the substrate. G2: Part of the residue of the electrode-material layers was observed on the outer peripheral surface of the second roll. In addition, a part of the region of the electrode material layer transferred onto the substrate was missing. G3: Residues of the electrode-material layers were observed at a plurality of locations on the outer peripheral surface of the second roll. In addition, transfer defects were observed at a plurality of positions in the electrode material layer transferred onto the base material.

TABLE 1

| | Solid content (% by mass) | | | | | | | |
|---|---|---|---|---|---|---|---|---|
| | 78.66 | 79.25 | 79.31 | 80.31 | 80.80 | 82.04 | 81.54 | 83.44 |
| Examples | G1 | G1 | G1 | G1 | G1 | G1 | G1 | G1 |
| Comparative Example | G3 | G3 | G3 | G3 | G2 | G2 | G2 | G2 |

As described above, in the electrode sheet obtained by the manufacturing method in the example, the transfer failure of the electrode material layer to the base material was reduced as compared with the electrode sheet obtained by the manufacturing method in the comparative example.

What is claimed is:

1. A manufacturing method of an electrode sheet, the manufacturing method comprising:

a preparation step of preparing a wet granulate containing an electrode material and a solvent;

a film forming step of passing the wet granulate through a gap between a first roll and a second roll including a solvent absorbing portion on an outer peripheral surface, to form an electrode material layer on the outer peripheral surface of the second roll, the solvent absorbing portion is a porous material having a porosity of 8% to 25% and a pore diameter of 1 μm to 1 mm; and a transfer step of transferring the electrode material layer onto a base material.

2. The manufacturing method according to claim 1, wherein the wet granulate has a solid content of 75.96% by mass to 80.31% by mass.

3. The manufacturing method according to claim 1, further comprising a roll drying step of drying the second roll prior to the film forming step.

4. The manufacturing method according to claim 3, wherein the roll drying step comprises heating the second roll using hot air, electromagnetic waves, or a combination thereof.

* * * * *